UNITED STATES PATENT OFFICE.

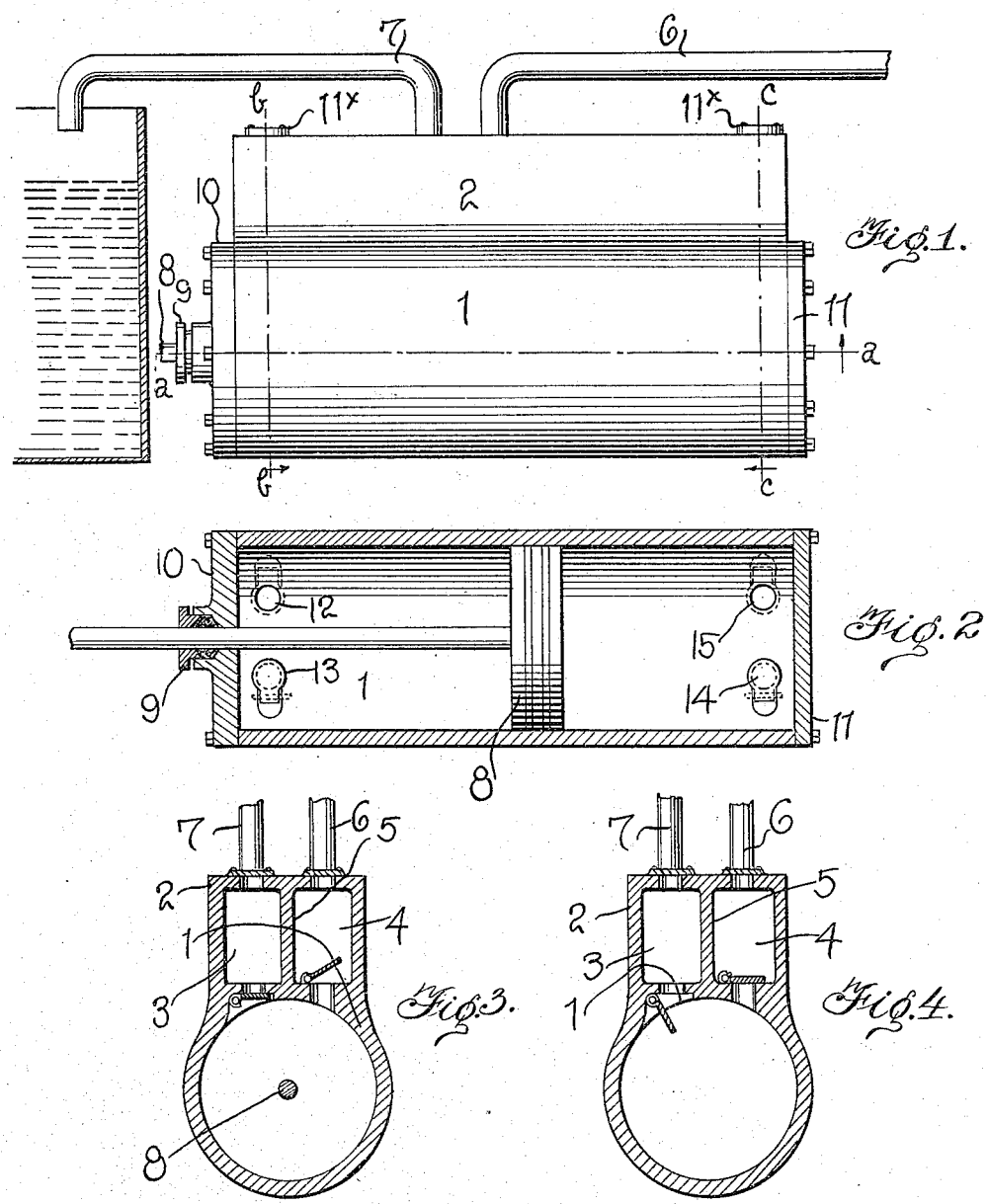

JOHN H. SIMS, OF ALAMOGORDO, NEW MEXICO; J. C. COMER ADMINISTRATOR OF SAID SIMS, DECEASED.

PUMP.

1,176,862.  Specification of Letters Patent.  Patented Mar. 28, 1916.

Application filed September 19, 1914. Serial No. 862,556.

*To all whom it may concern:*

Be it known that I, JOHN H. SIMS, a citizen of the United States, residing at Alamogordo, in the county of Otero and State of New Mexico, have invented certain new and useful Improvements in Pumps, of which the following is a specification, reference being had to the accompanying drawings.

My invention relates to certain new and useful improvements in pumps and particularly to that type in which a continuous flow of water is produced by the reciprocation of the piston in the pump cylinder.

My invention has for its object the production of a pump of the type referred to, which shall be simple of construction, thoroughly practical and successful in operation.

With these ends in view my invention consists in the details of construction and arrangement hereinafter more fully described.

In order that those familiar with the art to which my invention appertains may know how to make my improved pump I will proceed to describe the construction and operation of the same, referring by numerals to the accompanying drawing in which—

Figure 1, is a side elevation showing the pump with an adjacent receiving water tank, Fig. 2, is a longitudinal section on the line $a$—$a$ of Fig. 1, looking in the direction of arrow. Fig. 3, is a transverse section on the line $b$—$b$ of Fig. 1, looking in direction of arrow, and Fig. 4, is a similar section on the line $c$—$c$ of Fig. 1, looking in direction of arrow.

Similar reference numerals indicate like parts in the several figures of the drawing.

1. is an ordinary pump cylinder but formed with a longitudinal off-set 2, extending from end to end of the cylinder. This off-set produces a space between its outer extremity and the outer surface of the cylinder and this space is divided into two longitudinal compartments 3 and 4, by a partition 5. Each of these compartments communicate at each end with the pump cylinder 1, and are provided with reversely operating valves to be presently described.

The off-set is connected with an intake pipe 6, and an outgo pipe 7, and the cylinder is provided with an ordinary piston 8, the stem of which moves through a stuffing box 9 in the head 10 of the cylinder which is bolted in place in the usual manner, and the opposite end of the cylinder is closed in the same manner by a head 11.

At each end of the off-set is an opening in alinement with each of the valves, and these openings and valves are protected by caps $11^x$, which may be secured in place by screws or in any other proper manner and may be removed to give access to the valves when repair or substitution becomes necessary, 12, 13, 14 and 15 are valves to control the inflow of water to the cylinder from the intake pipe 6, and the discharge therefrom through the pipe 7 in the following manner: The valves 12 and 15 are in the compartment on one side of the partition 5, and the valves 13 and 14 are in the compartment on the opposite side of said partition. The valves 13 and 14 on one side of the partition 5 are the intake valves for reception of water from pipe 6 and the valves 12 and 15 on the opposite side of the partition 5 are outlet valves through which the water is conducted to the pipe 7. It will therefore be seen that as the piston moves away from the intake valve 13 said valve opens and water from the pipe 6 is taken into the cylinder while the outlet valve 12 is closed. When the movement of the piston is reversed the valve 14 is opened and the valve 15 closed and water is again supplied to the cylinder while the water previously supplied to the cylinder is ejected through the valve 12 to the outlet pipe 7 and the inlet valve 13 closed, and consequently as the piston is reciprocated the discharge of water from the cylinder is continuous, thus the improved pump performs the function of a duplex pump and can be manufactured at much less cost and can be operated with less labor or cost of fuel.

Having described the construction and operation of my improved pump what I claim as new and desire to secure by Letters Patent, is:—

1. In a pump, a cylinder having an integral offset portion extending the length of the cylinder and divided by a partition disposed in a plane intersecting the axis of the cylinder into an inlet and an outlet channel, said partition extending the full length of the offset portion, the inlet chamber at its ends being formed with ports leading into the opposite ends of the cylinder, the outlet chamber also having ports at its opposite ends leading into the cylinder, the inlet ports having inwardly opening valves controlling the passage therethrough, and the outlet ports having outwardly opening valves controlling the passage therethrough, a piston operating in the cylinder, a supply pipe entering one of said chambers at the middle thereof, a discharge pipe entering the other chamber at the middle thereof.

2. In a pump, a cylinder having an integral offset portion extending the length of the cylinder and divided into an inlet and an outlet chamber by a wall extending longitudinally of the offset portion, the inlet chamber at its ends being formed with ports leading into the opposite ends of the cylinder, the outlet chamber having ports also leading into the ends of the cylinder, inwardly opening valves controlling the passage of fluid through the inlet ports, outwardly opening valves controlling the passage of fluid through the outlet ports, the cylinder being formed with apertures opposite said valves, closures detachably covering said apertures, a piston operating within the cylinder, an inlet pipe entering the inlet chamber, and an outlet pipe extending from the outlet chamber.

In testimony whereof I hereunto affix my signature in the presence of two witnesses.

JOHN H. SIMS.

Witnesses:
A. F. MENGER,
B. F. PRUIT.

Copies of this patent may be obtained for five cents each, by addressing the "Commissioner of Patents, Washington, D. C."